US011117682B2

(12) United States Patent
Sato et al.

(10) Patent No.: US 11,117,682 B2
(45) Date of Patent: Sep. 14, 2021

(54) CASE STRUCTURE AND ARTIFICIAL SATELLITE

(71) Applicant: CANON DENSHI KABUSHIKI KAISHA, Saitama-ken (JP)

(72) Inventors: Tsumori Sato, Tokyo (JP); Ren Matsuzawa, Saitama-ken (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 453 days.

(21) Appl. No.: 16/107,406

(22) Filed: Aug. 21, 2018

(65) Prior Publication Data

US 2018/0354656 A1    Dec. 13, 2018

Related U.S. Application Data

(63) Continuation of application No. PCT/JP2017/002500, filed on Jan. 25, 2017.

(30) Foreign Application Priority Data

Feb. 29, 2016    (JP) .............................. JP2016-037945

(51) Int. Cl.
  *B64G 1/10*      (2006.01)
  *H02S 99/00*     (2014.01)
  (Continued)

(52) U.S. Cl.
  CPC ............... *B64G 1/10* (2013.01); *H02S 99/00* (2013.01); *B64G 1/363* (2013.01); *B64G 1/443* (2013.01); *B64G 2001/1092* (2013.01)

(58) Field of Classification Search
  CPC .......... B64G 1/10; B64G 1/363; B64G 1/443; B64G 2001/1092; H02S 99/00
  (Continued)

(56) References Cited

U.S. PATENT DOCUMENTS

| 8,702,040 B2 | 4/2014 | Takahashi et al. |
| 9,016,485 B1 | 4/2015 | Liu |

(Continued)

FOREIGN PATENT DOCUMENTS

| CN | 103303494 A | 9/2013 |
| JP | S58-52037 A | 3/1983 |

(Continued)

OTHER PUBLICATIONS

Mike, Rupprecht, AAU Cubesat, http://www.dk3wn.info/sat/afu/sat_aau_shtml, retrieved Feb. 16, 2017.

(Continued)

*Primary Examiner* — Christopher P Ellis
(74) *Attorney, Agent, or Firm* — Venable LLP

(57) ABSTRACT

A case structure forms a storage space for a first electronic component. The case structure includes a plurality of support posts that are disposed parallel to each other; and a plurality of panels that is provided among the plurality of support posts, the plurality of panels constituting outer walls. At least one panel of the plurality of panels is a panel having an outer surface on which a second electronic component provided, the second electronic component being connected with the first electronic component, and the plurality of panels is attached to the plurality of support posts in a detachable manner along a longitudinal direction of the plurality of support posts.

15 Claims, 9 Drawing Sheets

(51) Int. Cl.
*B64G 1/36* (2006.01)
*B64G 1/44* (2006.01)

(58) Field of Classification Search
USPC .................................................. 244/172.7
See application file for complete search history.

(56) References Cited

U.S. PATENT DOCUMENTS

| | | | |
|---|---|---|---|
| 9,150,313 B2 | 10/2015 | Puig-Suari et al. | |
| 10,538,341 B1* | 1/2020 | Fraze | B29C 64/10 |
| 2002/0023391 A1* | 2/2002 | Nymark | E04B 2/7453 |
| | | | 52/36.4 |
| 2005/0135724 A1 | 6/2005 | Helvajian et al. | |
| 2005/0257823 A1* | 11/2005 | Zwanenburg | H02S 30/20 |
| | | | 136/244 |
| 2006/0185277 A1* | 8/2006 | Quincieu | B64G 1/10 |
| | | | 52/265 |
| 2007/0038534 A1* | 2/2007 | Canter | B64G 1/428 |
| | | | 705/35 |
| 2009/0032530 A1 | 2/2009 | Chu | |
| 2011/0296675 A1* | 12/2011 | Roopnarine | B64G 1/10 |
| | | | 29/700 |
| 2014/0039729 A1* | 2/2014 | Puig-Suari | B64G 1/10 |
| | | | 701/3 |
| 2014/0263844 A1* | 9/2014 | Cook, Jr. | H02S 30/20 |
| | | | 244/164 |
| 2015/0210408 A1 | 7/2015 | Dunn et al. | |
| 2015/0367964 A1* | 12/2015 | Judd | B64G 1/363 |
| | | | 244/158.1 |
| 2015/0372374 A1* | 12/2015 | Judd | H01Q 1/08 |
| | | | 244/172.6 |
| 2016/0304206 A1* | 10/2016 | Von Ahlen | B29C 66/124 |
| 2016/0340061 A1* | 11/2016 | Bose | H05K 7/20254 |
| 2019/0145270 A1* | 5/2019 | Dunn | F01D 5/282 |
| | | | 428/33 |
| 2019/0284947 A1* | 9/2019 | Hock | F01D 25/005 |
| 2019/0305401 A1* | 10/2019 | Romano | H01Q 19/106 |
| 2020/0102100 A1* | 4/2020 | Lozano | B64G 1/64 |
| 2020/0385122 A1* | 12/2020 | Burd | B32B 3/12 |

FOREIGN PATENT DOCUMENTS

| | | |
|---|---|---|
| JP | H06-85218 U | 5/1993 |
| JP | 2004-196138 A | 7/2004 |
| JP | 2011240719 A | 12/2011 |
| WO | 0138896 A1 | 5/2001 |

OTHER PUBLICATIONS

International Search Report and Written Opinion issued in parent International Application No. PCT/JP2017/002500 dated Feb. 28, 2017.
Japanese Office Action issued in corresponding Japanese Application No. 2018-502597 dated May 10, 2019.
European Search Report issued in corresponding European Application No. 177594883.4 dated Feb. 12, 2019.

* cited by examiner

CASE STRUCTURE AND ARTIFICIAL SATELLITE

This application is a continuation of International Patent Application No. PCT/JP2017/002500 filed on Jan. 25, 2017, and claims priority to Japanese Patent Application No. 2016-037945 filed on Feb. 29, 2016, the entire content of both of which is incorporated herein by reference.

TECHNICAL FIELD

The present invention relates to a case structure of an artificial satellite or the like.

BACKGROUND ART

A hollow case having a panel-shaped outer wall has been proposed as a case of an artificial satellite (for example, see Japanese Patent Laid-Open No. 2011-240719 and Japanese Patent Laid-Open No. 2004-196138). A solar cell panel, a sensor, or the like is sometimes placed on an outer surface of the case, and an outer wall of the case is used also as a support body for such an electronic component.

Under a special environment such as outer space, placement of the electronic component on the outer wall of the case may require more rigorous quality management than under an ordinary environment. For example, in the case of placing the electronic component by bonding the electronic component to the outer wall of the case with an adhesive, if an air bubble is mixed in the adhesive, the air bubble will expand in outer space, sometimes resulting in departure of the electronic component from the outer wall of the case. Accordingly, electronic-component placement work must be performed while preventing the mixing of the air bubble.

Meanwhile, since the case is a hollow body, handling sometimes cannot be performed efficiently in the electronic-component placement work. For example, when the case has a polyhedron shape such as a rectangular shape, during the electronic-component placement work for a face, difficulty is encountered in performing the electronic-component placement work for another face. Accordingly, difficulty is encountered in efficiently performing the electronic-component placement work while meeting the quality requirement.

SUMMARY OF INVENTION

The present invention provides technology for facilitating the electronic-component placement work for the panel constituting the case.

According to an aspect of the present invention, there is provided a case structure that forms a storage space for a first electronic component, the case structure comprising: a plurality of support posts that is disposed parallel to each other; and a plurality of panels that is provided among the plurality of support posts, the plurality of panels forming outer walls, wherein at least one panel of the plurality of panels is a panel having an outer surface on which a second electronic component provided, the second electronic component being connected with the first electronic component, and the plurality of panels is attached to the plurality of support posts in a detachable manner along a longitudinal direction of the plurality of support posts.

Further features of the present invention will become apparent from the following description of exemplary embodiments with reference to the attached drawings.

DESCRIPTION OF EMBODIMENTS

First Embodiment

Figure 1:
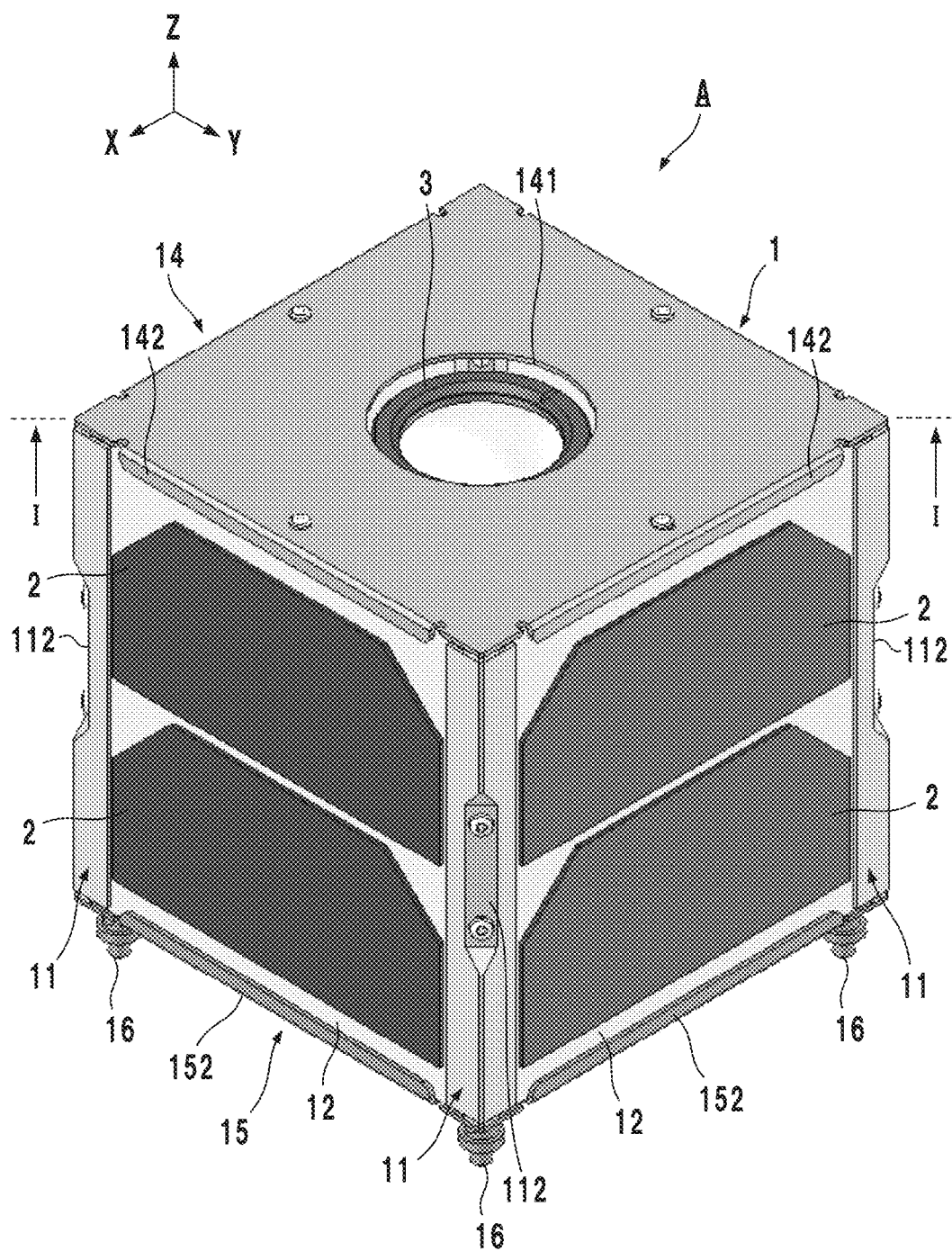
FIG. 1 is a perspective view of an artificial satellite according to an embodiment of the present invention.
Figure 2:
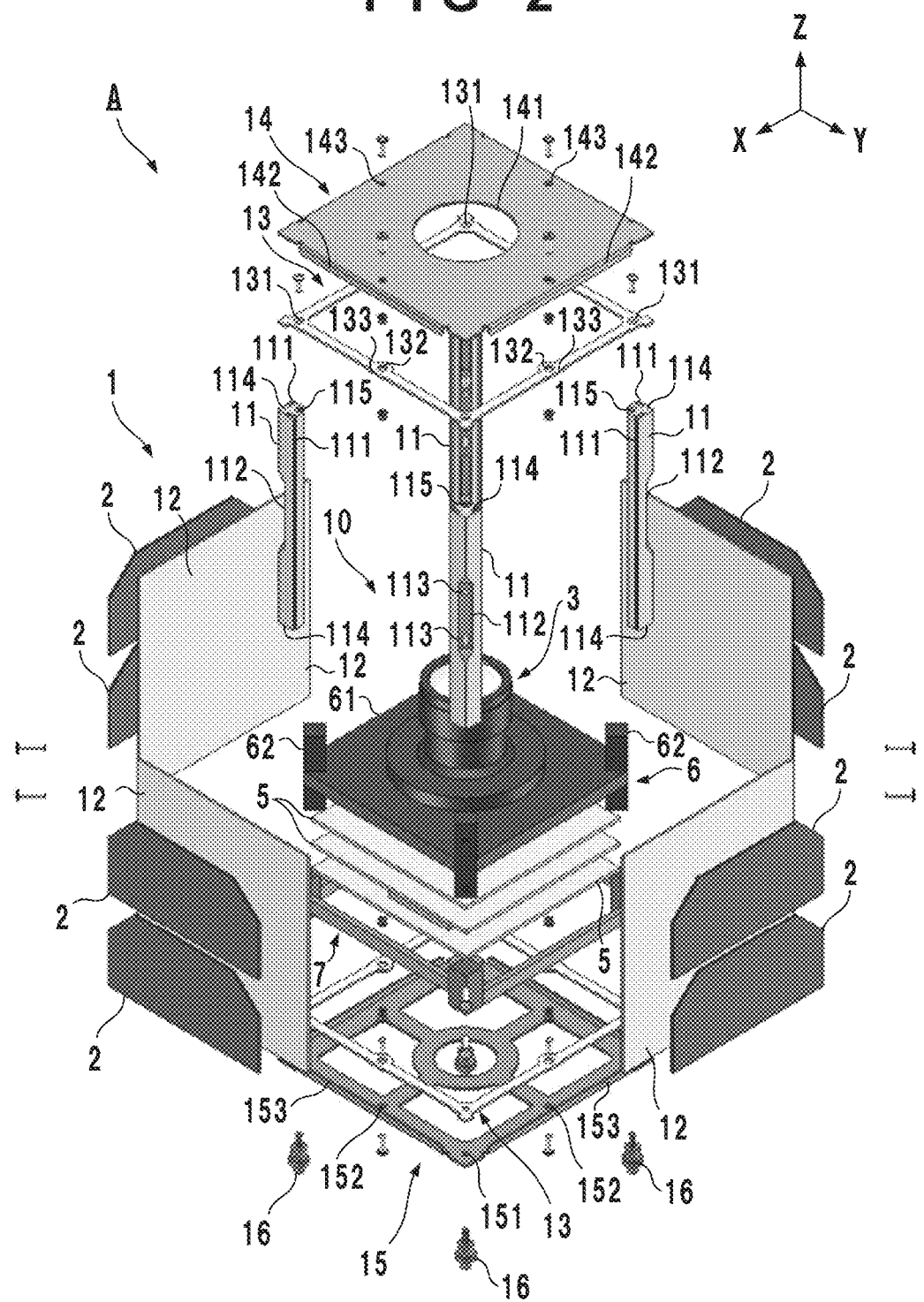
FIG. 2 is an exploded perspective view of the artificial satellite in FIG. 1.
Figure 3:
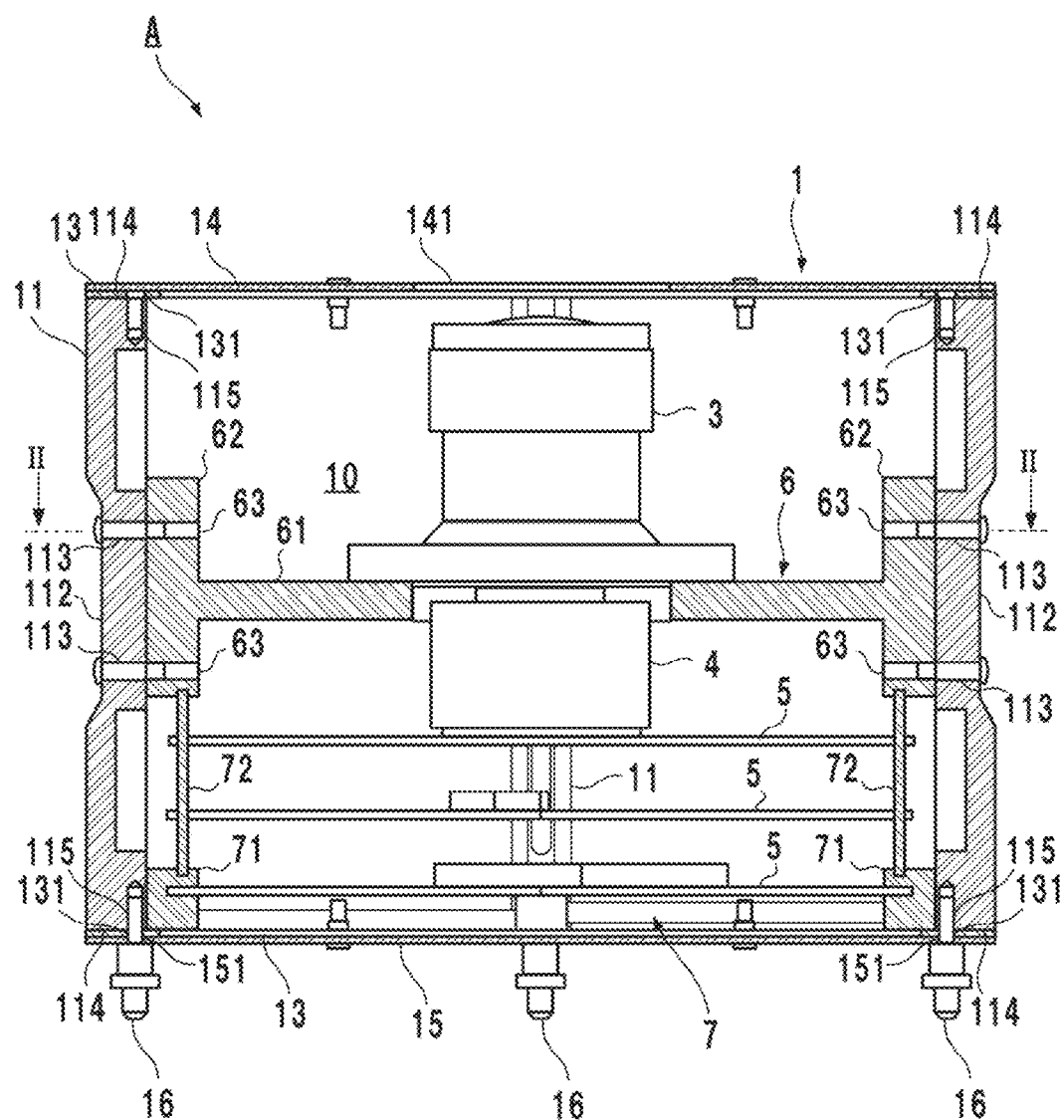
FIG. 3 is a cross-sectional view taken along line I-I in FIG. 1.
Figure 4:
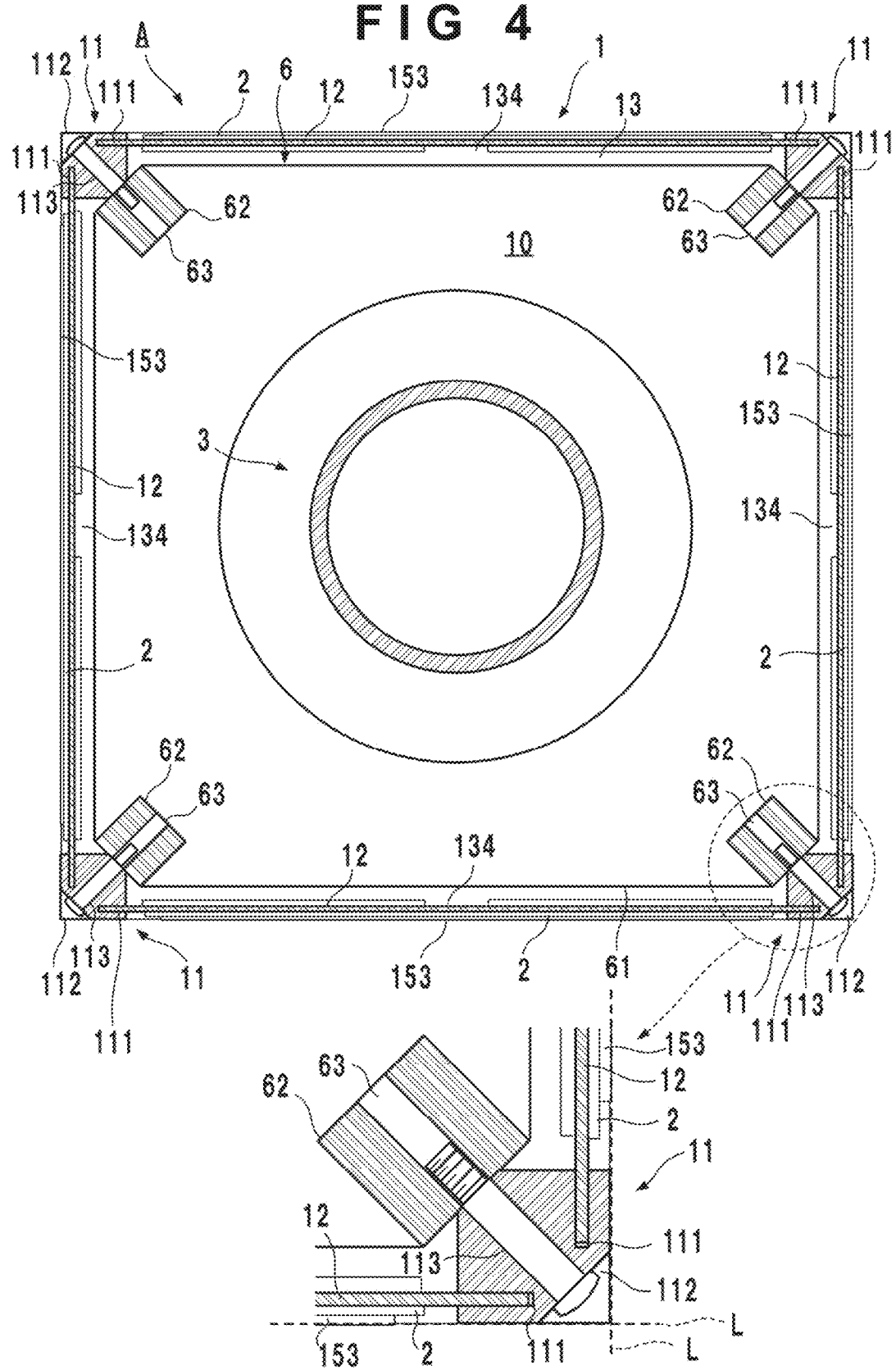
FIG. 4 is a cross-sectional view taken along line II-II in FIG. 3 and a partial enlarged view.

An artificial satellite according to an embodiment of the present invention will be described with reference to FIG. 1 to FIG. 4. In the figures, arrows X, Y, Z indicate directions orthogonal to each other. FIG. 1 is a perspective view of an artificial satellite A according to an embodiment of the present invention. FIG. 2 is an exploded perspective view of the artificial satellite A. FIG. 3 is a cross-sectional view taken along line I-I in FIG. 1. FIG. 4 is a cross-sectional view taken along line II-II in FIG. 3 and a partial enlarged view.

The artificial satellite A is a satellite having an image taking function, and includes a case 1 and a plurality of solar cell panels 2 supported by outer surfaces of the case 1. The case 1 has a cube shape as a whole, and each of the four side surfaces of the case 1 is provided with two solar cell panels 2. Each of the solar cell panels 2, which is connected with an electronic component stored in the case 1, receives solar light to generate electric power, and supplies the electric power to the electronic component.

The case 1 includes a plurality of support posts 11, a plurality of panels 12, a plurality of support frames 13, a top portion panel 14, and a bottom portion panel 15. The case structure of the case 1 will be described below.

Four support posts 11 are provided, and are disposed parallel to each other. Each support post 11 is positioned at one of the four corners of the case 1 having a cube shape. The support post 11 is an integrally molded product, and for example, is an aluminum extrusion product.

The support post 11 is a member having a quadrangular pillar shape whose longitudinal direction is the Z-direction. Grooves 111 are formed on two adjacent side surfaces of the four side surfaces of the support post 11. In the embodiment, the groove 111 is formed so as to penetrate through the support post 11 in the longitudinal direction, and opens not only on the side surface of the support post 11 but also on both end portions 114 in the longitudinal direction. Both edge portions of the panel 12 in the X-direction and the Y-direction are inserted into the grooves 111.

Threaded portions 115 are formed at respective end portions 114 of the support post 11. In the embodiment, each of the two threaded portions 115 is a threaded hole that extends in the Z-direction, but may be a threaded shaft. Alternatively, one of the two threaded portions 115 may be a threaded hole, and the other may be a threaded shaft. The threaded portions 115 are used for fixing the support frames 13 to respective end portions 114 of the support posts 11.

Further, the support post 11 allows another support post 11 to be joined thereto in the longitudinal direction, using the thread portion 115, and facilitates fabrication of a support post 11 having a longer total length. A specific example will be described later, as a fourth embodiment.

A concave portion 112 is formed at an outside corner portion of the four corner portions of the support post 11. On the concave portion 112, a plurality of attachment holes 113 is opened. Two attachment holes 113 are formed, and penetrate through the support post 11 in a diagonal direction. Screws are inserted into the attachment holes 113, so that a support body 6 disposed in the interior of the case 1 is fixed. An inside corner portion of the four corner portions of the support post 11 is formed so as to have a plane for an abutting surface with the support body 6.

The support frame 13 is a frame body having a square shape, and two support frames 13 are provided. One of the support frames 13 joins one-end portions 114 of the four support posts 11, and the other of the support frames 13 joins the other-end portions 114 of the four support posts 11 in the longitudinal direction. Attachment holes 131 are formed at the four corners of the support frame 13. Screws are inserted into the attachment holes 131 and are screwed into the threaded portions 115, so that the support frames 13 and the support posts 11 are fixed to each other.

The four support posts 11 and the two support frames 13 are assembled, so that a framework having a cube shape is formed. At the four corners of the support frame 13, cutouts are formed such that the grooves 111 of the support posts 11 are not closed. Even after the formation of the framework, at the end portions 114 of the support posts 11, the grooves 111 are open without being covered with the support frames 13.

An attachment hole 132 is formed at each middle portion of the four sides of the support frame 13. A nut is fitted into the attachment hole 132, and one of the top portion panel 14 and the bottom portion panel 15 is fixed by a screw.

The plurality of panels 12 constitutes outer walls of the case 1. In the embodiment, four panels 12 are provided, and form the four side surfaces of the case 1. Each panel 12 is a flat panel having a square shape, and is disposed so as to link the adjacent support posts 11 while both edge portions in the X-direction or the Y-direction are inserted into the grooves 111 of the adjacent support posts 11. Since the panel 12 is configured to be inserted into or extracted from the groove 111, the panel 12 can be mounted to the support posts 11 in a detachable manner.

Each panel 12 can be formed, for example, by coating the surface of a plate material such as an aluminum plate with an insulating member. As the insulating member, there can be adopted a thin film composed of a material having flexibility, such as a resin. Since the insulating member has flexibility, the panel 12 can be securely locked with the grooves 111, with no backlash.

By assembling the four support posts 11 and the four panels 12, a polygonal tube, particularly, a quadrangular tube, is formed. On this occasion, as shown in the enlarged view in FIG. 4, the outer surface of the panel 12 and the solar cell panel 2 are positioned on the inside of a virtual plane L that contains the outer surface of the adjacent support post 11. Therefore, by the four support posts 11, the outer surface of the panel 12 and the solar cell panel 2 can be protected against the exterior. For example, when the artificial satellite A is put in a rocket while being stored in a container having a quadrangular tube and is released in the Z-direction from the container into outer space, it is possible to slightly separate the panels 12 and the solar cell panels 2 from the inner wall surfaces of the container, although the four support posts 11 contact with the inner wall surfaces, and it is possible to avoid the surfaces of the panels 12 and solar cell panels 2 from being damaged, for example, from being grazed.

The top portion panel 14 is a panel whose external contour has a square shape, and constitutes a top wall of the case 1. An opening portion 141 through which light passes is formed at a central portion of the top portion panel 14. The opening portion 141 forms an exposure opening portion that is coaxial with the optical axis of a lens barrel 3.

Stoppers 142 that are formed by folding marginal edges at 90 degrees and that extend in the Z-direction are formed on the four sides of the top portion panel 14. The stoppers 142 are positioned on the outside of the panels 12, and prevent the panels 12 from dropping off from the grooves 111.

Attachment holes 143 are formed on the top portion panel 14. Through the attachment holes 143, screws are screwed into the nuts fitted into the attachment holes 132 of the support frame 13, and thereby, the top portion panel 14 is fixed to the support frame 13.

The bottom portion panel 15 is a frame body whose external contour has a square shape, and constitutes a bottom wall of the case 1. Attachment holes 151 are formed at the four corners of the bottom portion panel 15. Through the attachment holes 131, 151, threaded shafts of leg portions 16 are screwed into the threaded portions 115, and thereby, the bottom portion panel 15, the support frame 13, and the support posts 11 are fixed to each other. Four leg portions 16 are provided and positioned at the four corners of the bottom portion panel 15, and end portions in the Z-direction form threaded shafts.

Stoppers 152 that are formed by folding marginal edges at 90 degrees and that extend in the Z-direction are formed on the four sides of the bottom portion panel 15. The stoppers 152 are positioned on the outside of the panels 12, and prevent the panels 12 from dropping off from the grooves 111.

A storage space 10 in the interior of the case 1 includes the lens barrel 3, a drive unit 4, the support body 6, a plurality of substrates 5, and a support body 7.

The lens barrel 3 is a focal-length-changeable lens barrel whose optical axis is set in the Z-direction, and for example, is a Cassegrain telescope. The drive unit 4 is a unit that changes the focal length of the lens barrel 3, and includes an actuator such as a motor or a solenoid. An image pickup element that images the light passing through the lens barrel 3 to take an image, various sensors, an attitude control unit, a power supply circuit, a control circuit, and the like are mounted on the plurality of substrates 5, and the electric power for the electronic components is supplied from the solar cell panels 12.

The support body 6 is a reinforcement member that supports the lens barrel 3, that is connected with the four support posts 11, and that increases the steric stiffness of the support posts 11. The support body 6 is a member in which pillared joining portions 62 are formed at the four corners of a main body 61 having a square plate shape. The lens barrel 3 is supported on a central portion of the main body 61, and the joining portion 62 abuts the side of the support post 11 opposite the concave portion 112. On the joining portion 62, there is formed a threaded hole 63 corresponding to the attachment hole 113 formed on the concave portion 112. A screw is inserted into the attachment hole 113 from the side of the concave portion 112, and is screwed into the threaded hole 63, so that the support body 6 and the support post 11 are fixed to each other. Since the support body 6 performs both the support of the lens barrel 3 and the reinforcement of the four support posts 11, the number of components can be decreased. Since the concave portion 112 is provided, a head portion of the screw is contained in the concave portion 112, and does not protrude to the exterior of the case 1. Thereby, for example, when the artificial satellite A is put in a rocket while being stored in a container having a quadrangular tube shape and is released in the Z-direction from the housing device into outer space, it is possible to avoid a situation in which the head portion of the screw is caught by the inner wall surfaces of the container, which would otherwise result in unsuitable performance of the release.

The support body 7 is a frame body having a square shape and supports mainly the substrates 5, and at the four corners, pillared base portions 71 are formed. Each of the base portions 71 includes a slit into which one of the plurality of substrates 5 is inserted, and supports this substrate 5, and a support shaft 72 stands thereon. The support shaft 72 joins the joining portion 62 of the support body 6 and the base portion 71. The remaining substrates 5 are supported by the support shaft 72.

The substrate 5 may be provided so as to be capable of being drawn out in the X-direction or the Y-direction. For example, a cutout portion may be provided on the support shaft 72, such that the substrate 5 can be moved into or out of the cutout portion in the X-direction or the Y-direction in a state in which the panel 12 has been removed. Thereby, the replacement of the substrate 5, and the like can be performed simply by the removal of the panel 12. Therefore, it is possible to avoid a situation in which all peripheral structures need to be disassembled or removed for the replacement of the substrate 5.

In the artificial satellite A having the above-described configuration, since the panel 12 can be detached from the support posts 11, it is possible to separately perform the assembly of the framework and the placement of the solar cell panel 2 on the panel 12.

For example, the framework having a cube shape is formed by assembling the four support posts 11 and the two support frames 13, and then the lens barrel 3, the drive unit 4, and the substrates 5 can be attached to the framework by the support bodies 6, 7.

In parallel, the work for placing the solar cell panel 2 on the panel 12 is performed. For example, the solar cell panel 2 is bonded to the outer surface of the panel 12 with an adhesive. If an air bubble is mixed in the adhesive during the bonding work, the air bubble expands in outer space, sometimes resulting in the solar cell panel 2 falling away. The solar cell panel 2 needs to be provided at a position on the panel 12 other than the edge portions that are inserted into the grooves 111.

In the embodiment, it is possible to bond the solar cell panel 2 to the panel 12 in the state of independent members detached from the case 1, and therefore, it is possible to efficiently perform the placement work under an environment in which the prevention of the mixing of the air bubble and the positioning of the solar cell panel 2 can be accurately performed. Accordingly, it is possible to facilitate the work of the placement of the solar cell panel 2 on the panel 12 constituting the case 1. Further, the subsequent storage can be performed in the state of the panel, instead of the state of the steric shape such as the case 1, and therefore, there is an advantage in the reduction in storage space, and the like.

After the completion of the assembly of the framework portion and the placement of the solar cell panel 2 on the panel 12, they are assembled. The grooves 111 of the support posts 11 are open at the end portions 114 even after the attachment of the support frames 13, and therefore, in this state, it is possible to attach the panels 12 among the support posts 11 by inserting the panels 12. At the time of the insertion of the panels 12, since the solar cell panels 2 are bonded at positions other than the edge portions that are inserted into the grooves 111, the support posts 11 and the solar cell panels 2 do not interfere with each other. Finally, the top portion panel 14, the bottom portion panel 15, and the leg portions 16 are attached, thereby completing the artificial satellite A.

The structure of the case 1 in the embodiment has a relatively simple configuration, and therefore, is easily applied to a relatively small artificial satellite, such as a 10-cm cube type artificial satellite called a 1U, and the like.

Second Embodiment

Figure 5:
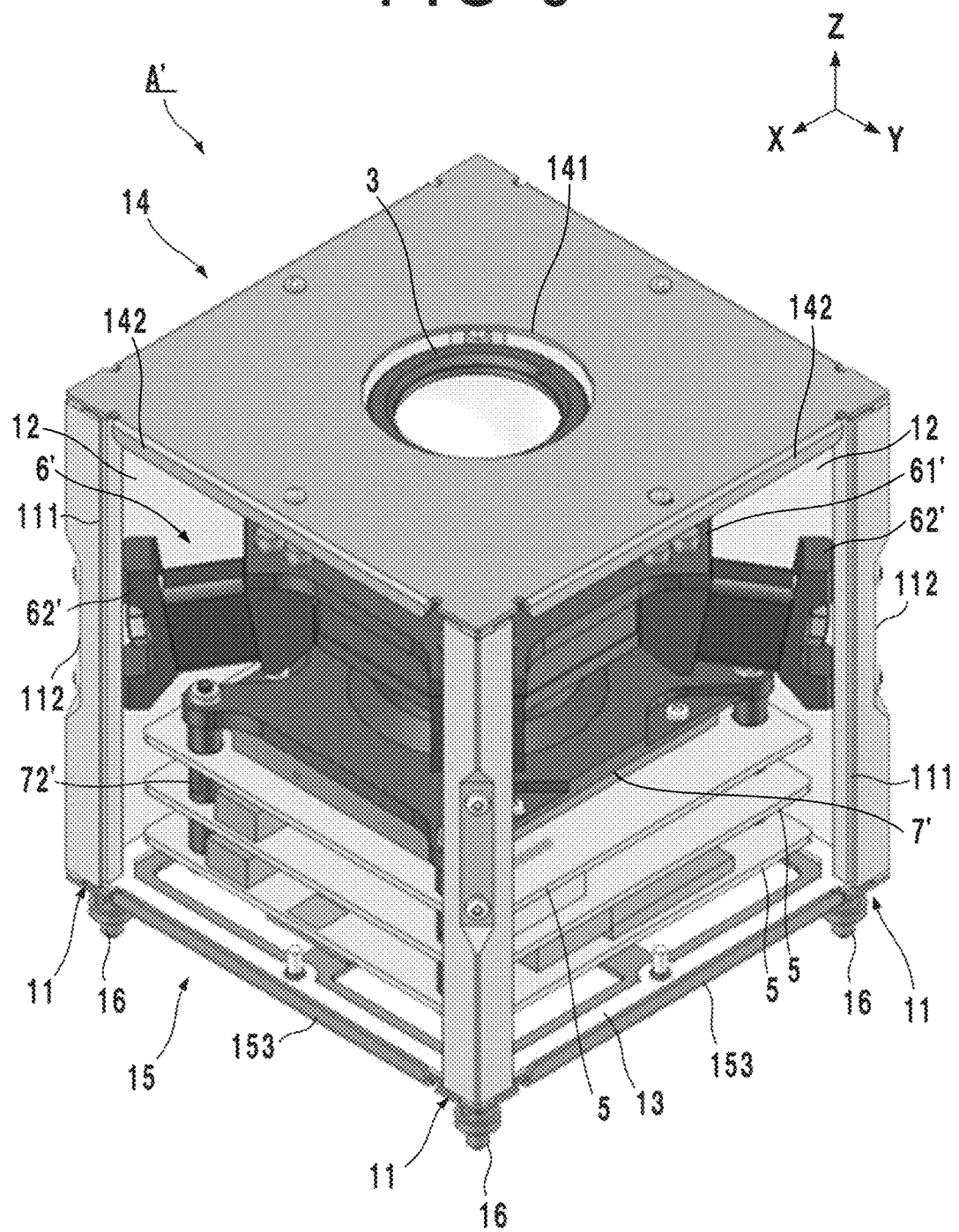
FIG. 5 is a partially-exploded perspective view of an artificial satellite in another example.

As the configuration of the support body 6 and the support body 7, various configurations can be employed. FIG. 5 illustrates a support body 6' and a support body 7' in another example. FIG. 5 shows an artificial satellite A' in which the support body 6' and support body 7' are employed instead of the support body 6 and support body 7 of the artificial satellite A in the first embodiment. The figure shows a state in which two panels of the four panels 12 of the artificial satellite A' have been removed.

The support body 6' includes a main body 61' and four joining portions 62', which correspond to the main body 61 and the joining portions 62 in the first embodiment, and is configured to have a higher stiffness than the main body 61 and the joining portions 62 in the first embodiment. The support body 7' is joined to the main body 61, and support shafts 72' extending in the Z-direction from the four corners support the plurality of substrates 5.

Third Embodiment

Figure 6A:
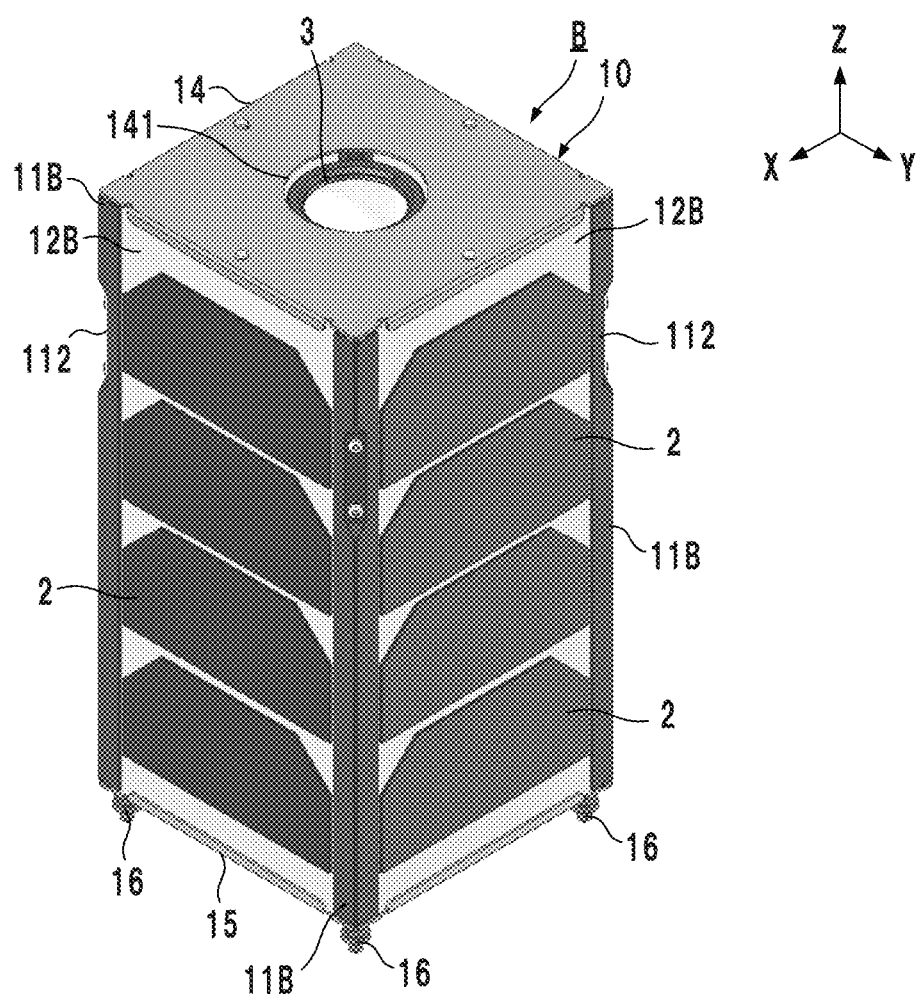
FIG. 6A is a perspective view of an artificial satellite in another example.
Figure 6B:
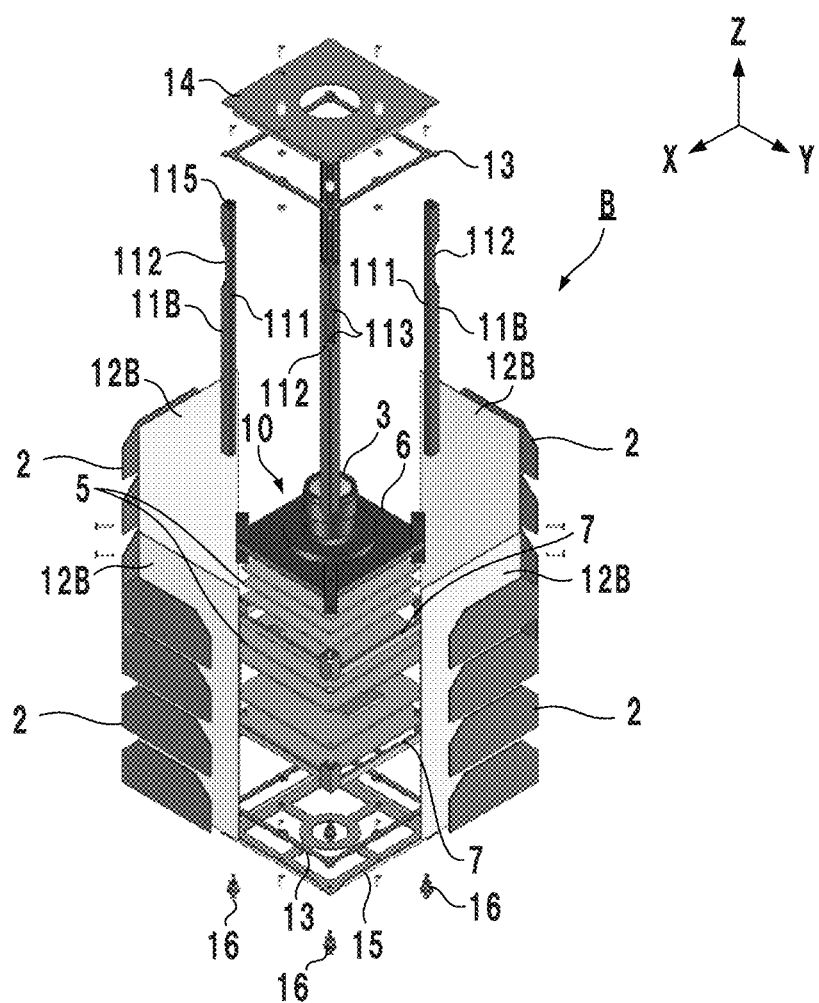
FIG. 6B is an exploded perspective view of the artificial satellite in FIG. 6A.

The artificial satellite A in the first embodiment has a cube shape, but can be configured to have a rectangular solid shape. FIG. 6A and FIG. 6B are a perspective view and an exploded perspective view of an artificial satellite B according to another embodiment of the present invention. In the artificial satellite B, for the same constituents as the artificial satellite A, which are denoted by the same reference characters, the descriptions will be omitted, and different constituents will be described.

The artificial satellite B includes support posts 11B and panels 12B, instead of the support posts 11 and the panels 12. The support post 11B and the panel 12B are longer in Z-directional length than the support post 11 and the panel 12, and thereby, the artificial satellite B is longer in total length than the artificial satellite A. Since the total length is longer, it is possible to increase the volume of the storage space 10 in the interior and increase the load. Further, it is possible to employ a lens barrel 3 with a longer focal length.

Conversely, simply by replacing the support posts 11 and the panels 12 with the support posts 11B and the panels 12B, it is possible to obtain a case 1 having a different total length, while using the other components similarly. The embodiment is easily applied, for example, to an artificial satellite having a total length of 20 cm, which is called a 2U.

Fourth Embodiment

Figure 7A:
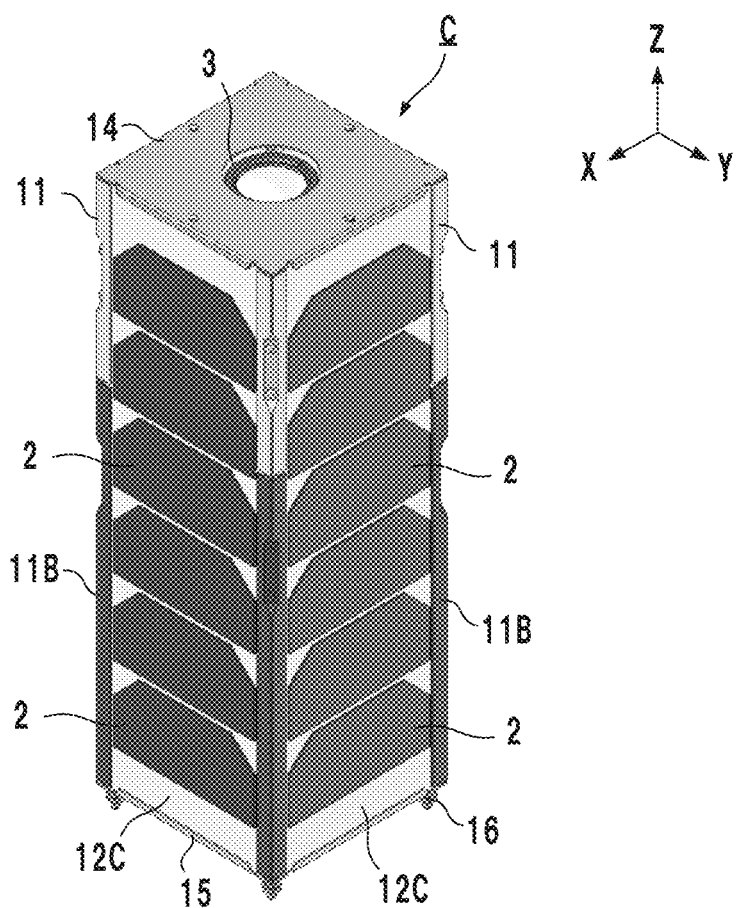
FIG. 7A is a perspective view of an artificial satellite in another example.
Figure 7B:
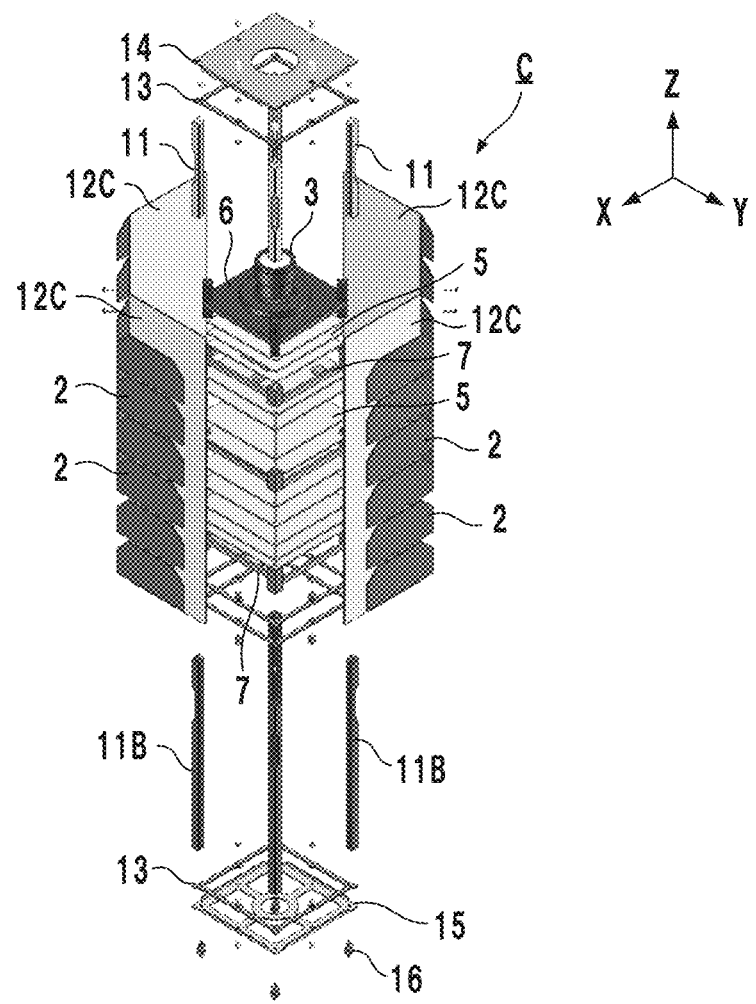
FIG. 7B is an exploded perspective view of the artificial satellite in FIG. 7A.

It is also possible to construct an artificial satellite having a longer total length than in the third embodiment. FIG. 7A and FIG. 7B are a perspective view and an exploded perspective view of an artificial satellite C according to another embodiment of the present invention. In the artificial satellite C, for the same constituents as the artificial satellites A, B, which are denoted by the same reference characters, the descriptions will be omitted, and different constituents will be described.

Similarly to the artificial satellite B, the total length of the artificial satellite C is also increased by increasing the Z-directional total length of the support post and the panel. However, the support post 11 in the first embodiment and the support post 11B in the third embodiment are joined and used as the support post, and only a panel (a panel 12C) is used as a dedicated product. The support post 11 and the support post 11B are joined to each other, using the thread portion 115. The groove 111 of the support post 11 and the groove 111 of the support post 11B are continuous, and therefore, it is possible to insert the panel 12C from an end portion of the joined body.

The embodiment is easily applied, for example, to an artificial satellite having a total length of 30 cm, which is called a 3U. The support post 11 can be adopted as a support post for the 1U, the support post 11B can be adopted as a support post for the 2U, and a support post resulting from joining the support post 11 and the support post 11B can be adopted as a support post for the 3U. Thereby, it is possible to easily prepare multiple types of cases having different total lengths.

Other Embodiments

In the above embodiments, the solar cell panel 2 is placed on the panel 12 to 12C. However, the electronic component to be placed is not limited to this, and may be a sensor. For example, the sensor may be a direction sensor that detects the direction of the sun. Further, multiple types of electronic components may be placed on the panel 12 to 12C. The placement method for the electronic component is not limited to bonding with an adhesive, and may be screwing, fitting, or the like. In the embodiment, it is possible to place the electronic component in a state in which the panel 12 to 12C as an independent member has been detached from the case 1. Therefore, in the electronic-component placement work, the treatment is relatively easy even when positioning accuracy or fixing accuracy is required.

In the above embodiments, examples in which the case structure in the present invention is applied to the artificial satellites have been described. However, the case structure in the present invention can be applied also for another use purpose in which the electronic component is placed on the outer surface.

In the cases 1 in the above embodiments, there have been described examples in which the plurality of support posts 11 or the like and the plurality of panels 12 or the like form tube bodies having quadrangular tube shapes. However, a tube body having another polygonal tube shape such as a triangular tube shape or a hexagonal tube shape may be formed. Furthermore, a tube body having a circular tube shape or an elliptical tube shape may be formed.

The cases 1 in the above embodiments have a structure in which the plurality of support posts 11 or the like and the plurality of panels 12 or the like can be detached from each other, by adopting an attachment structure in which the edge portions of the panels 12 or the like are inserted into the grooves 111. However, the attachment structure is not limited to this, and may be another engagement structure such as screwing or fitting between holes and shafts.

In the cases 1 in the above embodiments, there have been exemplified structures of including reinforcement members (the support body 6 and the support body 7 in FIG. 2 or the support body 6' and the support body 7' in FIG. 5) joining facing support posts 11 so as to traverse the space surrounded by the plurality of support posts 11 and reinforcing the stiffness of the case 1. For example, when the stiffness of the case is kept depending on purpose of use, such a reinforcement member does not need to be provided. Even if the reinforcement member is provided, a plate member having a panel shape may be provided as the reinforcement member instead of being provided in a beam shape, or the reinforcement may be performed such that the plurality of support posts 11 is surrounded by a frame member. The reinforcement may be performed by appropriately combining them.

The present invention is not limited to the above embodiments and various changes and modifications can be made within the spirit and scope of the present invention. Therefore, to apprise the public of the scope of the present invention, the following claims are made.

The invention claimed is:

1. A case structure that forms a storage space for a first electronic component, the case structure comprising:
    a plurality of support posts disposed parallel to each other;
    a plurality of panels provided among the plurality of support posts, the plurality of panels forming outer walls, wherein at least one panel of the plurality of panels is a support panel having an outer surface on which a second electronic component provided, the second electronic component being connected with the first electronic component;
    a top portion panel different from the plurality of panels;
    grooves into which edge portions of the plurality of panels are inserted, the grooves being formed on the plurality of support posts, respectively, wherein each groove extends from one end of a corresponding post in the plurality of support posts to an opposite end of the corresponding post,
    wherein each groove includes an open end at the one end of the corresponding post,
    wherein the plurality of panels is attached to the plurality of support posts in a detachable manner along a longitudinal direction of the plurality of support posts via the grooves, and
    wherein the top portion panel is arranged so as to close the open end of each of the grooves.

2. The case structure according to claim 1, further comprising a reinforcement member provided so as to traverse a space surrounded by the plurality of support posts, the reinforcement member reinforcing a case stiffness by joining at least one pair of facing support posts of the plurality of support posts.

3. The case structure according to claim 1, wherein the second electronic component is bonded to the support panel.

4. The case structure according to claim 1, wherein the second electronic component is provided at a position other than the edge portions of the plurality of panels.

5. The case structure according to claim 1, wherein the second electronic component is bonded to the support panel with an adhesive, at a position other than the edge portions of the plurality of panels.

6. The case structure according to claim 4, wherein each of the grooves is formed so as to penetrate through each of the support posts in a longitudinal direction.

7. The case structure according to claim 6, wherein
threaded portions are formed at both end portions of each of the plurality of support posts, each of the threaded portions allowing joining of another support post.

8. The case structure according to claim 1, wherein
the plurality of support posts and the plurality of panels form a polygonal tube, and
the outer surface of the panel and the second electronic component are positioned on an inside of a virtual plane that contains an outer surface of an adjacent support post of the support posts.

9. The case structure according to claim 8, wherein
the second electronic component is a solar cell panel.

10. The case structure according to claim 8, wherein
the second electronic component is a sensor.

11. An artificial satellite comprising:
a case that forms a storage space for an electronic component; and
a solar cell panel that is connected with the electronic component, wherein
the case comprises:
a plurality of support posts disposed parallel to each other;
a plurality of panels provided among the plurality of support posts, the plurality of panels constituting outer walls, wherein at least one panel of the plurality of panels is a support panel having an outer surface on which the solar cell panel is provided;
a top portion panel different from the plurality of panels;
grooves into which edge portions of the plurality of panels are inserted, the grooves being formed on the plurality of support posts, respectively, wherein each groove extends from one end of a corresponding post in the plurality of support posts to an opposite end of the corresponding post,
wherein each groove includes an open end at the one end of the corresponding post, and
wherein the top portion panel is arranged so as to close the open end of each of the grooves.

12. The artificial satellite according to claim 11, wherein
the electronic component is supported by a support body that is connected with the plurality of support posts.

13. An artificial satellite comprising:
a case that forms a storage space for an electronic component; and
a solar cell panel connected with the electronic component, wherein
the case comprises:
a plurality of support posts disposed parallel to each other;
a plurality of panels provided among the plurality of support posts, the plurality of panels constituting outer walls, wherein at least one panel of the plurality of panels is a support panel having an outer surface on which the solar cell panel is provided; and
grooves into which edge portions of the plurality of panels are inserted, the grooves being formed on the plurality of support posts, respectively, wherein each groove is formed so as to penetrate through each of the support posts in a longitudinal direction,
wherein the solar cell panel is provided on the support panel at a position other than the edges portions of the plurality of panels.

14. The artificial satellite according to claim 11, further comprising a support frame that joins the one end of each of the plurality of support posts, and wherein
the support frame is arranged between the one end of each of the plurality of support posts and the top portion panel so as not to close the open end of each of the grooves.

15. The artificial satellite according to claim 11, further comprising a lens barrel in the storage space, and wherein
the top portion panel includes an opening portion through which light to the lens barrel passes.

* * * * *